April 22, 1969   W. H. PEDERSON   3,439,763
ENDLESS TRACK ATTACHMENT FOR MOTORIZED CYCLES
Filed Nov. 14, 1966   Sheet 1 of 2

INVENTOR.
WALTER H. PEDERSON
BY
John C. Barnes
ATTORNEY

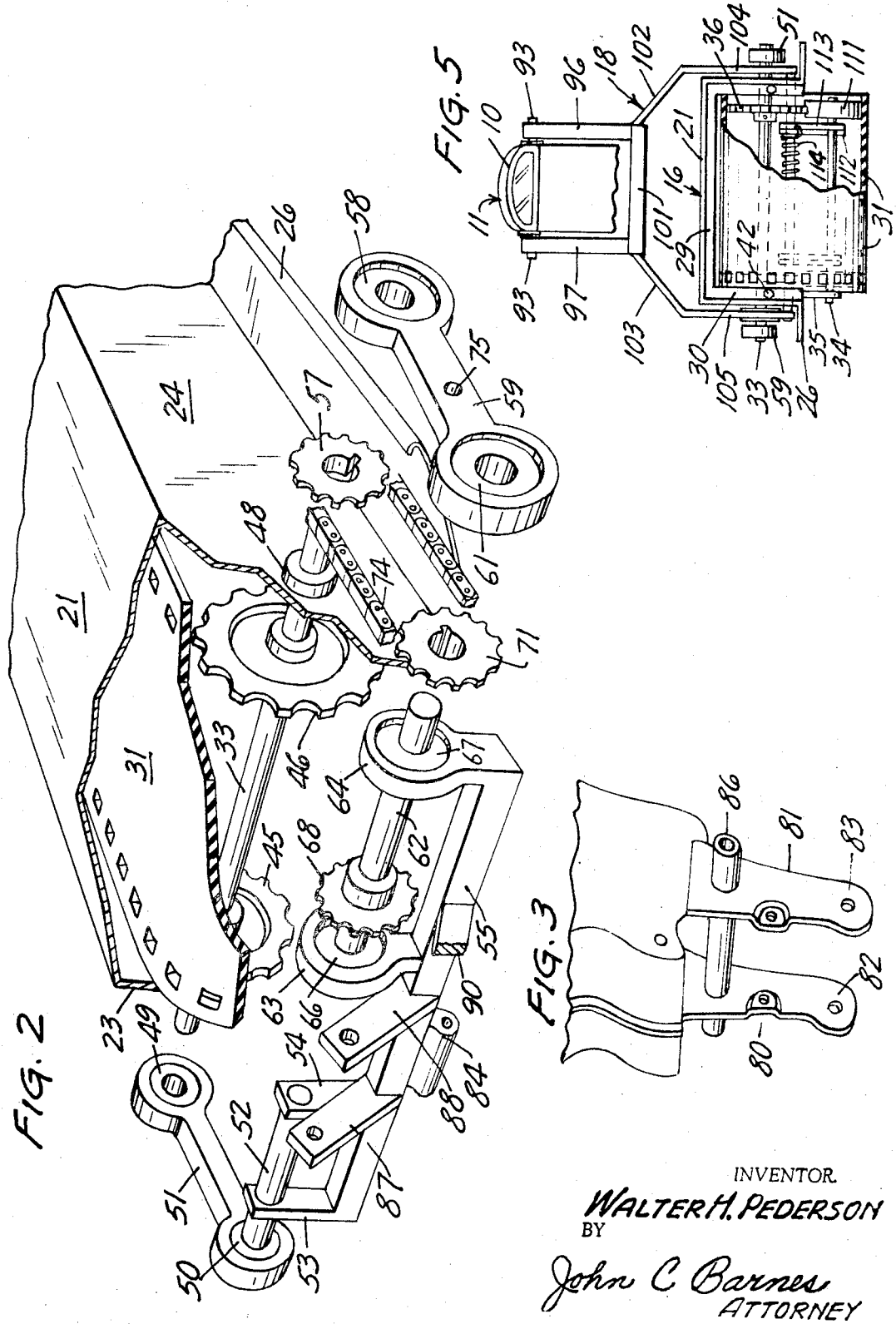

United States Patent Office 3,439,763
Patented Apr. 22, 1969

3,439,763
ENDLESS TRACK ATTACHMENT FOR MOTORIZED CYCLES
Walter H. Pederson, Rte. 1, Woodland Hills,
East St. Cloud, Minn. 56301
Filed Nov. 14, 1966, Ser. No. 593,776
Int. Cl. B62d 55/04
U.S. Cl. 180—9.24                                       5 Claims

ABSTRACT OF THE DISCLOSURE

An attachment for use in place of the rear wheel of a motorcycle to make the cycle suitable for use in soft terrain which includes a torque transfer member to connect one end of the frame for an endless belt to the drive member of a cycle and a weight-force transmitting member to support the cycle from the intermediate portion of the frame.

---

This invention relates to an attachment or accessory for two-wheeled motorized vehicles, commonly known as cycles, i.e., motorcycles or motorbikes, and particularly to an accessory which will readily adapt such vehicles for travel over soft terrain such as snow or sand.

Previously known assemblies adapted to be substituted for the drive wheel of a cycle have been generally unacceptable because they were too heavy, they lacked sufficient flexibility to maintain good driving contact with an uneven terrain, and they reduced maneuverability of the cycle, particularly on cornering. This latter aspect is particularly true of the assemblies utilizing a pair of spaced tracks because of the spaced relationship of the tracks and because the tracks are generally driven uniformly from a single shaft without the incorporation of a differential drive system for the tracks.

The device of the present invention overcomes these deficiencies.

The device of the present invention utilizes a single relatively wide and substantially solid endless belt or track which is entrained about a shaft having drive sprocket means and which is otherwise supported by resiliently mounted wheels. The belt supporting wheels are mounted on a tunnel-like frame which is swingably attached adjacent its forward end to the cycle frame, by a transversely extending power-transmitting and support bar and pivotally connected parallel links, and is attached beneath the rear cycle fender by a weight-transmitting lever means. The weight-transmitting lever means is connected at one end portion to the existing shock absorber supports for the rear fork of the cycle and at its other end to the tunnel-like frame intermediate its ends. A drive train for the endless belt is provided by a pair of drive chains between the cycle motor and the power-transmitting and support bar, and between the support bar and the shaft carrying the drive sprockets.

This novel combination affords a soft terrain propelling device which will readily fluctuate to conform to the terrain and maintain drive contact over a substantial portion of its surface-engaging area.

The assembly of this invention includes a novel weight-transmitting support member which is pivotally connected to the main frame generally centrally thereof to distribute weight to the main frame and a propelling force back to the cycle.

The device of the present invention is light weight and adapted to be connected to and driven by even the light lower-powered motorbikes presently commercialized.

These and other novel features and advantages of the present invention will become more apparent upon a purusal of the following description which refers to the accompanying drawings wherein:

FIGURE 2 is an exploded view of the forward end of the device of the present invention showing the several parts of the power-transmitting and support bar and drive sprockets;

FIGURE 3 is a fragmentary perspective view of the lower frame of a cycle;

FIGURE 5 is a rear elevational view of the device of the present invention and the cycle of FIGURE 1.

Figure 1:
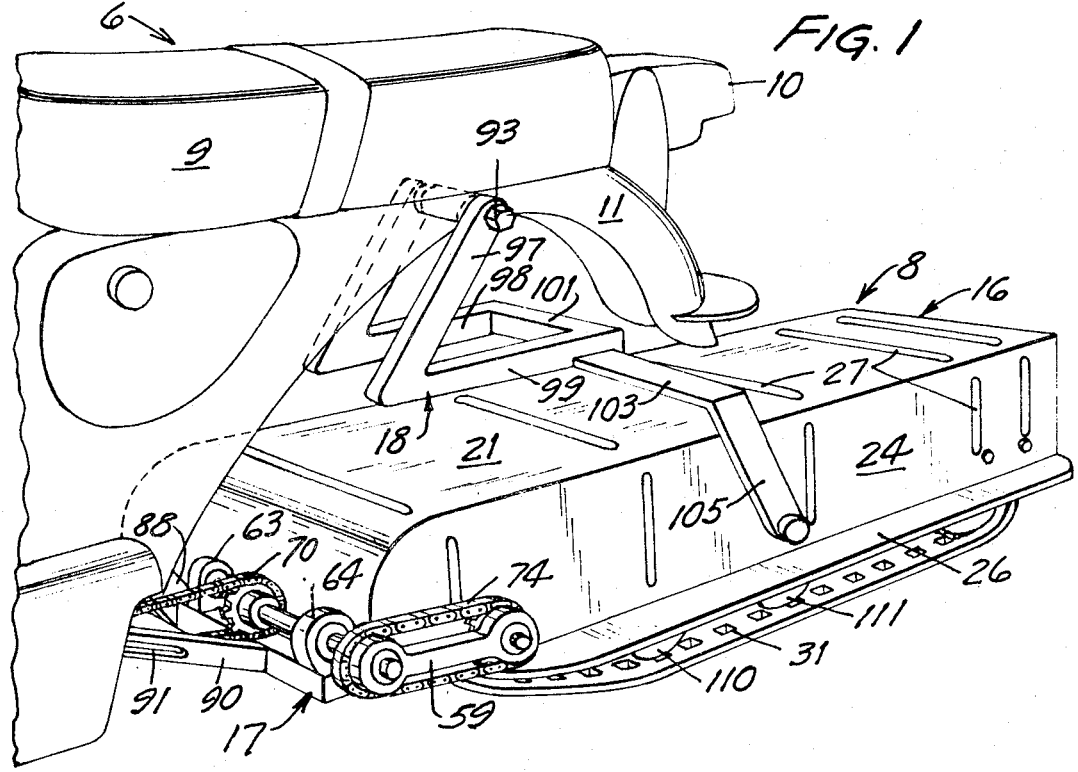
FIGURE 1 is a fragmentary perspective view of the rear portion of a cycle showing the device of the present invention attached thereto.

Referring now to the drawing, there is illustrated in FIGURE 1, in perspective, the rear portion of a cycle 6 showing the accessory 8 of the present invention secured thereto. The drawing shows the cycle seat 9, tail light assembly 10 and the rear portion of the unitized frame including the rear fender section 11.

The accessory 8 comprises an elongate tunnel-like frame 16 attached adjacent its forward end to the lower portion of the cycle frame by a transversely extending power-transmitting and support bar assembly 17 and secured to the cycle beneath the fender section 11 by means of a weight force transmitting lever assembly 18.

The tunnel-like frame 16 may be formed of sheet metal, e.g., 18-gauge material, which is bent and formed to define an upper plate 21, having a forward downwardly curved portion 22, opposed side panels 23 and 24, which along their lower edge have outward oppositely extending flange portions 25 and 26. The sheet material may be formed with pressed ridges 27 to give the frame added strength. A U-shaped tubular frame formed of one-inch rectangular tube stock is secured in an inverted position at the rear edge of the frame 16 to the top plate 21 and side plates 23 and 24, affording still more rigidity to the frame without adding significantly to its weight. The rear tubular frame is formed of an upper transverse bar 29 and vertically depending bars 30 which are secured to the side panels 23 and 24. The overall length of the tunnel-like frame 16 is about 42 inches with a transverse width of about 16 inches. The side walls 23 and 24 have a vertical dimension of about 7 inches.

The frame 16 supports a flexible endless belt 31 which has a transverse width of about 15½ inches. The belt 31 extends around a drive shaft 33 rotatably mounted at the forward end of the frame 16, and an adjustable idler sprocket shaft 34 supported at the rear end of the frame 16.

Figure 4:
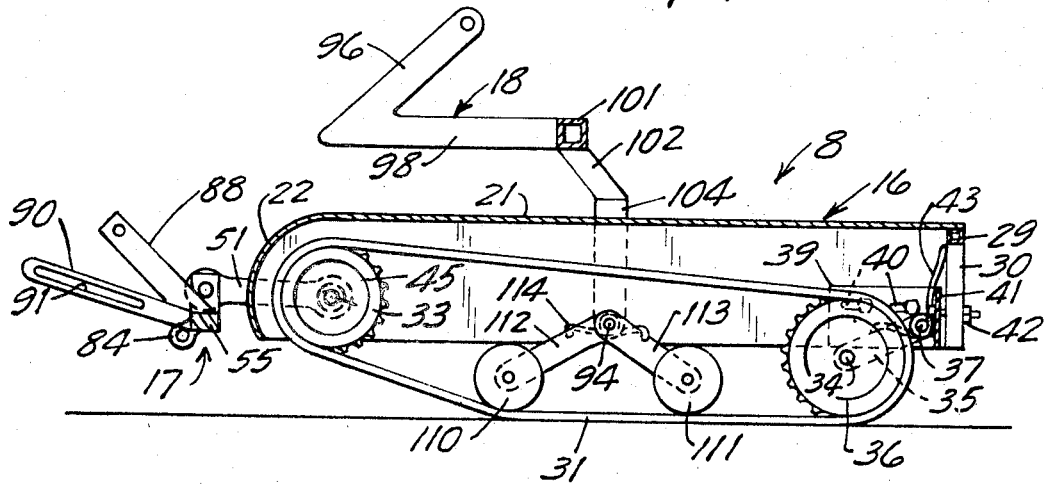
FIGURE 4 is a longitudinal vertical sectional view through the device of the present invention.

Referring first to the idler shaft 34 is is supported at opposite ends by suitable bearings mounted in pivoted links 35. Adjacent each end of the shaft 34 and between the links 35 are sprocket wheels 36 which are keyed to the shaft 34 and which are formed by a metal hub portion and an outer peripheral toothed hardened resilient portion formed of very hard dense rubber or the like. The links 35 are each pivoted on a stub shaft 37 carried by adjustable plate members 39 which are fastened by nut and bolt assemblies 40 to the side walls 23 and 24 of the frame 16. The plates 39 are formed with slotted openings receiving the assemblies 40 affording forward and rearward adjustment of the plates 39, links 35 and shaft 34 to tighten the endless belt 31. Forward and rearward adjustment of the plates 39 are provided by right angle flanges 41 formed at the rear edges of the plates 39 through which are placed bolt and nut assemblies 42. These assemblies 42 also extend through the frame members 30 positioned vertically at the rear of the side plates 23 and 24. Adjustment of the assemblies 42 position and maintain adjustment for the plates 39. Torsion springs 43 are placed about the stub shafts 37 and have radially extending end members, one end of each spring being positioned in engaging relation with the vertical frame members 30 and the opposite end of each spring engages the associated link 35 urging the same and the shaft 34 in a downward or counterclockwise direction as viewed in FIGURE 4, thus providing a resilient support and guide for the rear edge of the belt 31 from the pivoted frame 16.

Referring now to FIGURES 2 and 3 particularly, there is shown the forward drive shaft 33 having sprocket wheels 45 and 46 keyed thereto in transversely spaced relation. The sprocket wheels 45 and 46 preferably comprise a center hub section formed of metal with an outer perpiheral edge formed of a hardened noise dampening, high friction, resilient material, such as for sprocket wheels 36. The sprocket teeth are formed on the outer periphery of the wheels and have a driving connection with perforations along each edge of the belt 31. The shaft 33 is journaled in the side walls 23 and 24 of the frame 16, which side walls support suitable bearings 48 and which side walls may be reinforced with circular metal plates supporting the bearings 48 and strengthening the side walls 23 and 24 in those areas. The opposite ends of the shaft 33 project beyond the side walls 23 and 24. One end of the shaft 33 is fitted in a sealed ballbearing 50 which is supported in one end of a link 51. The other end of link 51 is provided with a sealed ballbearing 51 and fits on a fixed stub shaft 52. Stub shaft 52 is supported in brackets 53 and 54 which are fixed to the main transverse bar 55 of the power-transmitting and support bar assembly 17. The opposite end of the drive shaft 33 has a chain drive sprocket 57 keyed thereto with the outer end supported in a ballbearing 58 carried in one end of a link 59 corresponding to and parallel with the link 51. The other end of the link 59 supports a sealed ballbearing 61 which is fixed to the outer end of a rotating drive-transmitting or power shaft 62. Power shaft 62 is supported rotatably by spaced pillow blocks 63 and 64 which are fixed to the bar 55. Pillow blocks 63 and 64 carry self-aligning bearings 66 and 67, respectively. Intermediate the pillow blocks 63 and 64 and keyed to the shaft 62 is a second chain sprocket 68 around which a drive chain 70 leading from the motor of the cycle 6 is entrained. Between the pillow block 64 and the link 59 is a third chain sprocket 71 keyed to the shaft 62. The sprocket 71 and the sprocket 57 transmit the driving torque from the shaft 62 to the belt drive shaft 33 through a chain 74 entrained about said sprockets. The link 59 is provided with an opening 75 affording attachment for an idler sprocket (not shown) which may serve to tighten and remove slack from the chain 74.

Alternatively, the shaft 62 could extend along the bar 55 and join links 51 and 59 but the stub shaft 52 serves adequately to provide a support for the link 51.

A chain guard, not shown, may also be supported on the link to cover chain 74 and sprockets 57 and 71.

The links 51 and 59 pivotally secure the forward end of the frame 16 to the power-transmitting and supporting assembly 17 to limited vertical swinging motion of the forward end of the frame 16 with respect to the assembly 17. The overall length of the links 51 and 59 is about 8½ inches and pivotal movement of the same permits vertical movement of the frame with respect to the assembly 17 of about 7 inches.

The main support bar 55 of the assembly 17 is secured to the lower portion of the cycle frame, which lower portion is illustrated in FIGURE 3. This lower portion of the cycle frame includes depending bifurcated members 80 and 81 which are formed adjacent their lower edge with reinforced aligned holes 82 and 83, respectively. Between these bifurcations 80 and 81 will readily fit a sleeve 84 which is welded to the forward underside of the bar 55. A suitable bolt, approximately one-half inch in diameter and five inches long may then be placed through the hole 83, sleeve 84 and hole 82 to secure the bar 55 thereto. Disposed above the holes 82 and 83 of the cycle frame is a transversely extending hollow torque tube 86. Additional bracket means in the form of a pair of links 87 and 88 are welded to the forward and upper surfaces of the bar 55 and are formed with openings aligning with the hollow tube 86. These openings in the tube 86 permit the attachment of the links 87 and 88 thereto by means of a suitable bolt and nut assembly (not shown). Also formed on the forward face of the bar 55 and extending upwardly and inclined therefrom, e.g., at an angle of approximately 15 degrees is a link 90 formed with an elongated slot 91 which receives an adjustable bolt and nut assembly supporting a ballbearing assembly engageable with the drive chain 70 which serves as a slack adjusting device for such drive chain (see FIGURES 1 and 4).

Frame 16 is secured to the cycle 6 beneath the rear fender section 11. This attachment is made by the weight-force transmitting lever assembly 18. Lever assembly 18 is connected at its upper portion to the existing shock absorber attaching support rod or bolt assemblies 93. The lower portion of the assembly 18 is joined to the frame 16 by attachment to the opposite ends of a transverse rod 94 which is secured intermediate its ends onto frame 16. The upper end portion of the assembly 18 comprises two transversely spaced parallel and forwardly inclined downwardly directed arms 96 and 97. Rigidly connected to the lower ends of the arms 96 and 97 is a U-shaped frame positioned generally parallel to the frame 16. The U-shaped frame comprises rearwardly extending arms 98 and 99 which extend from the lowermost ends of arms 96 and 97 to a position below and rearward of the assemblies 93. A transversely extending brace 101 connects the terminal ends of the arms 98 and 99. Joined to and extending downwardly and outwardly from the terminal ends of arms 98 and 99, in a divergent manner, are support arms 102 and 103 which connect to vertically extending platelike support arms 104 and 105. The arms 104 and 105 depend vertically downwardly along the sides of the walls 23 and 24 and are formed with openings receiving opposite ends of the rod 94, pivotally connecting said arms to the frame 16. The arms 96, 97, 98 and 99 and brace 101 are formed of a rigid hollow tube stock such as rectangular tubing having a dimension in cross section of, for example, 1 x 1½ inches. This assembly 18, extending between the existing shock absorber mounting assemblies 93 and the intermediate portion of the frame 16 is the weight-bearing connection for the accessory 8. This assembly is so formed that the weight from the cycle to the attachment produces a substantially vertical moment or force vector on the axis of rod 94 even though this rod is disposed rearward of the assemblies 93. The leverage afforded by the downwardly and forwardly extending arms 96 and 97 together with the arms or links 98 and 99 tend to cancel any force vectors directed rearwardly of the rod 94 which would urge the attachment 8 rearward or which would place tension in links 51 and 59 when weight is placed on the cycle. Any such force is undesirable and the phenomena afforded by the shape of the assembly 18 effectively provides the weight distribution downward adjacent the center of the frame 16. The assembly 18 further transmits propelling force from the driven belt 31 and frame 16 to the cycle.

The resilient mounting for the shaft 34 and sprockets 36 is also aided by two sets (two pairs) of resiliently mounted bogie wheels 110 and 111, respectively. The bogie wheels 110 and 111 are mounted in U-shaped support frames which frames are mounted to pivot about the rod 94. Suitable torsion springs 114 are supported about the shaft 94 and urge the U-shaped frames 112 and 113 and wheels 110 and 111 downwardly into engagement with the lower stretch of the belt 31 intermediate the sprocket wheels on the drive shaft 33 and on the idler shaft 34. These wheels are so positioned to resiliently urge the lower stretch of the belt into engagement with the terrain over which the cycle is moving and affords a slight incline at the forward end of the belt between the forward set of bogie wheels 110 and the drive sprockets 45 and 46.

Having thus described a preferred embodiment of my cycle attachment, it is to be understood certain modifications may be made without departing from the spirit or scope of this invention.

What I claim as my invention is:

1. An endless track assembly adapted for attachment in place of the rear wheel of a two-wheeled motorized cycle adapting the same for travel over soft terrain, said assembly comprising:
   an elongate tunnel-like frame having a forward and trailing end,
   a pair of shafts disposed one adjacent each end of said frame,
   a single endless belt trained about said shafts,
   sprocket means supported on said shafts for directing and driving said belt about said shafts,
   a bar spaced forwardly of said forward end of said frame and extending parallel to said shafts,
   bracket means on said bar for connecting said bar to the lower frame of a said cycle,
   means on said bar pivotally connecting the same to opposite ends of said one of said pair of shafts disposed adjacent the forward end of said frame, permitting limited pivotal movement of said frame relative to said bar,
   means on said bar transferring driving torque from the motor of a said cycle to said one of said pair of shafts disposed adjacent the forward end of said frame, and
   a weight-force transmitting means comprising transversely spaced vertically extending arms pivotally secured to said tunnel-like frame intermediate the ends thereof, a U-shaped frame adapted to be disposed in a plane generally parallel to said tunnel-like frame having its trailing end connected to the upper ends of said arms, and transversely spaced arms connected to the forward end of said U-shaped frame and inclined to the plane of said U-shaped frame and adapted for connection at their free ends to the rear fender portion of a said cycle.

2. An endless track assembly mounted on a two-wheeled motorized cycle as a substitute for the rear wheel thereof adapting said cycle for travel over soft terrain, said cycle having a centrally mounted motor and a rear frame portion, said cycle and assembly comprising:
   an elongated tunnel-like frame having a forward end and a trailing end,
   a driven shaft rotatably supported on said frame at said forward end,
   an idler shaft rotatably supported on said frame adjacent the trailing end,
   a pair of transversely spaced sprocket wheels supported on each of said shafts,
   a wide endless belt trained about said shafts and engageable with the sprocket wheels on said driven shaft for the transfer of driving force to said belt,
   a support bar positioned in spaced relationship forward of said frame and generally parallel to said driven shaft,
   a power shaft rotatably mounted on said bar and extending parallel thereto,
   drive means on said power shaft affording a driving connection with a drive chain from the motor of said cycle to said shaft and affording a driving connection from said power shaft to said driven shaft on the forward end of said frame,
   link means supported by said bar and said drive shaft affording a pivotal connection between said bar and said frame to permit movement therebetween, and
   a weight-force transmitting frame assembly joined at one end to said frame intermediate the ends thereof and adapted for connection at its other end to the rear frame portion of said cycle, said frame assembly comprising a pair of transversely spaced parallel arms extending downward and forward from the rear frame portion of said cycle and at an incline relative to said frame, means rigidly secured to the lower ends of said arms and extending rearwardly therefrom generally parallel to said frame, and a pair of transversely spaced downwardly extending arms connected to said means and adapted for pivotal connection to said frame intermediate the ends thereof for transferring weight from and driving force from said cycle and frame respectively.

3. An assembly according to claim 2, wherein said idler shaft is resiliently mounted to said frame and resiliently mounted bogie wheels are supported on said frame in a position for engaging the inner surface of the lower stretch of said belt trained about said driven and idler shafts to resiliently urge the belt toward the surface of the supporting terrain and maintain tension in said belt.

4. An endless belt drive assembly adapted to be substituted for the rear wheel of a two-wheeled motorized cycle, said assembly comprising an elongate tunnel-like frame having a forward and trailing end, an endless belt mounted for rotational movement relative to said tunnel-like frame, drive means for said belt comprising sprocket wheels on longitudinally spaced shafts positioned adjacent the forward and trailing end of said tunnel-like frame to place at least one stretch of said endless belt below said tunnel-like frame, driving and mounting means including a pair of pivoted links connected to said forward shaft for connecting the forward end of said tunnel-like frame to a said cycle, and frame means pivotally connected to said tunnel-like frame intermediate the ends of said tunnel-like frame to mount said tunnel-like frame beneath the rear fender of a said cycle to transfer the weight of a said cycle to said tunnel-like frame in a direction generally normal to said tunnel-like frame, said frame means comprising a first pair of generally vertically extending spaced arms pivotally connected generally centrally to said tunnel-like frame and a second pair of spaced arms including forwardly extending portions and then upwardly and rearwardly extending portions, rigid with said first pair of arms, for connecting said tunnel-like frame beneath the rear portion of a said cycle.

5. An assembly as claimed in claim 4 wherein said driving and mounting means further comprises a transfer bar having means thereon for rigidly attaching said bar to a lower portion of a said cycle frame, and a torque-transmitting shaft journalled on said bar and pivotally connected to one end of each of said pivoted links and drivingly connected to said forward shaft for transferring torque to said forward shaft.

References Cited

UNITED STATES PATENTS

| | | | |
|---|---|---|---|
| 1,055,609 | 3/1913 | Chesney | 180—5 |
| 2,323,526 | 7/1943 | Eliason | 180—5 X |
| 3,252,533 | 5/1966 | Aeder | 180—5 |
| 3,309,150 | 3/1967 | Marier | 180—5 X |
| 3,362,492 | 1/1968 | Hansen | 180—5 |
| 2,475,250 | 7/1949 | Petersen | 180—9.24 X |
| 3,318,403 | 5/1967 | Hansen | 180—5 |

FOREIGN PATENTS 187,290   1/1937   Switzerland.

RICHARD J. JOHNSON, Primary Examiner.

U.S. Cl. X.R.

180—5; 305—35